US006233735B1

(12) United States Patent
Ebihara

(10) Patent No.: US 6,233,735 B1
(45) Date of Patent: May 15, 2001

(54) NEAR VIDEO-ON-DEMAND SYSTEM AND BROADCASTING METHOD THEREFOR

(75) Inventor: Norio Ebihara, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 08/902,604

(22) Filed: Jul. 10, 1997

Related U.S. Application Data

(63) Continuation of application No. PCT/JP96/03320, filed on Nov. 12, 1996.

(30) Foreign Application Priority Data

Nov. 13, 1995 (JP) ................................................ 7-294439

(51) Int. Cl.[7] ................................................ H04N 7/173
(52) U.S. Cl. ................................................ 725/101
(58) Field of Search ................................ 348/7, 12, 13; 455/5.1; 709/217, 219; 725/101

(56) References Cited

U.S. PATENT DOCUMENTS

| | | | |
|---|---|---|---|
| 5,471,450 | * 11/1995 | Yonemitsu et al. | 369/60 |
| 5,600,573 | * 2/1997 | Hendricks et al. | 364/514 R |
| 5,608,448 | * 3/1997 | Smoral et al. | 348/7 |
| 5,671,386 | * 9/1997 | Blair et al. | 395/405 |
| 5,682,597 | * 10/1997 | Gannek et al. | 455/4.2 |
| 5,724,646 | * 3/1998 | Gannek et al. | 455/4.2 |
| 5,761,417 | * 6/1998 | Henley et al. | 348/7 |
| 5,793,410 | * 8/1998 | Rao | 348/7 |
| 5,793,971 | * 8/1998 | Fujita et al. | 395/200.49 |

FOREIGN PATENT DOCUMENTS

| | | |
|---|---|---|
| 0 686 908 A1 | 12/1995 | (EP) . |
| 7-325156 | 12/1995 | (JP) . |
| 8-46584 | 2/1996 | (JP) . |

* cited by examiner

*Primary Examiner*—Andrew I. Faile
*Assistant Examiner*—Kieu-Oanh Bui
(74) *Attorney, Agent, or Firm*—Frommer Lawrence & Haug, LLP.; William S. Frommer; Dennis M. Smid

(57) ABSTRACT

A near video-on-demand (NVOD) system and method for incorporating and/or updating a commercial (CM) or promotion video program or the like in a video program. The NVOD system may include a controller, a high-speed digital reproducing device for reproducing at a high rate a plurality of video-on-demand system recording data divided from digital data of a main program and recorded at discrete areas, an additional information program data server for reproducing data of an additional information program such as data of a CM video program, a promotion video program, or like, a buffer device for selectively writing the video-on-demand system recording data from the high-speed digital reproducing device and reading the video-on-demand system recording data, and matrix switcher for selectively outputting main program data from the buffer device and additional information data from the additional information program data server, and sequentially transmitting the main program data with the additional information data incorporated at M locations therein to a number of channels.

8 Claims, 7 Drawing Sheets

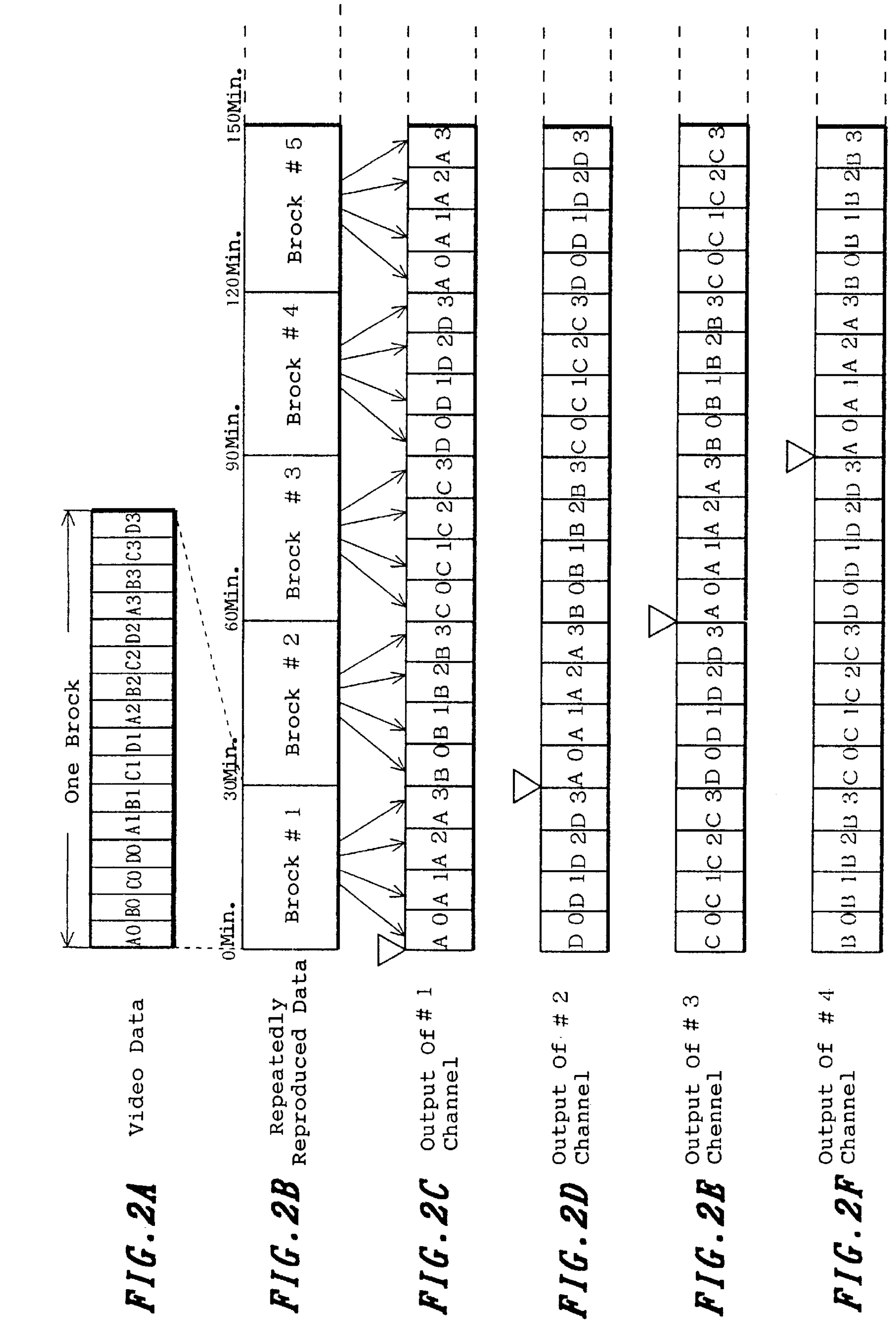
FIG.2A Video Data
One Brock
A0 B0 C0 D0 A1 B1 C1 D1 A2 B2 C2 D2 A3 B3 C3 D3
FIG.2B Repeatedly Reproduced Data
0Min. 30Min. 60Min. 90Min. 120Min. 150Min.
Brock #1 Brock #2 Brock #3 Brock #4 Brock #5
FIG.2C Output of #1 Channel
FIG.2D Output of #2 Channel
FIG.2E Output of #3 Chennel
FIG.2F Output of #4 Channel

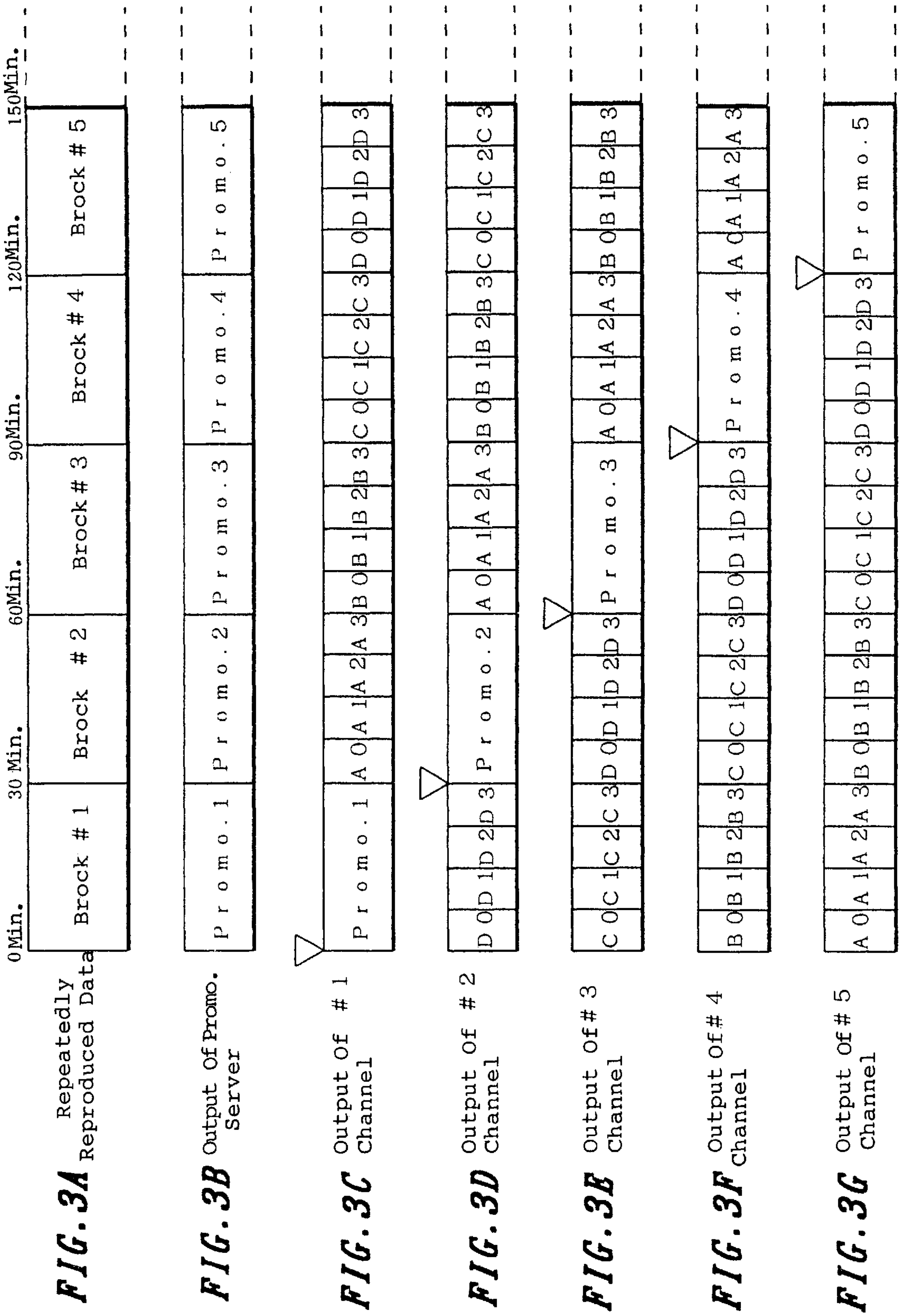

FIG. 3A Repeatedly Reproduced Data | Brock #1 | Brock #2 | Brock #3 | Brock #4 | Brock #5

FIG. 3B Output of Promo. Server | Promo.1 | Promo.2 | Promo.3 | Promo.4 | Promo.5

FIG. 3C Output of #1 Channel | Promo.1 | A 0A 1A 2A 3B 0B 1B 2B 3C 0C 1C 2C 3D 0D 1D 2D 3

FIG. 3D Output of #2 Channel | D 0D 1D 2D 3 | Promo.2 | A 0A 1A 2A 3B 0B 1B 2B 3C 0C 1C 2C 3

FIG. 3E Output of #3 Channel | C 0C 1C 2C 3D 0D 1D 2D 3 | Promo.3 | A 0A 1A 2A 3B 0B 1B 2B 3

FIG. 3F Output of #4 Channel | B 0B 1B 2B 3C 0C 1C 2C 3D 0D 1D 2D 3 | Promo.4 | A 0A 1A 2A 3

FIG. 3G Output of #5 Channel | A 0A 1A 2A 3B 0B 1B 2B 3C 0C 1C 2C 3D 0D 1D 2D 3 | Promo.5

NEAR VIDEO-ON-DEMAND SYSTEM AND BROADCASTING METHOD THEREFOR

This is a continuation of copending International Application PCT/JP96/03320 having an international filing date of Nov. 12, 1996.

TECHNICAL FIELD

The present invention relates to a near video-on-demand system for use in a subscription television broadcasting system which is called a pay television system or a restricted reception system, and a broadcasting method for such a near video-on-demand system.

BACKGROUND ART

In recent years, many video movies, for example, have been broadcast on pay television. When main programs such as video movies are broadcast on pay television, an additional information program such as a CM (commercial) video program, a promotion video program, or the like is broadcast between main programs, i.e., before the start of a video movie or after the end of a video movie, but not inserted in the middle of a video movie.

Present pay television programs are broadcast through a single channel, and CM video program, promotion video programs, or the like (hereinafter referred to as "CM video programs") are broadcast together before the start of a video movie or after the end of a video movie. Since video movie materials and CM video program materials are different from each other, it is easy to update CM video program materials.

Recently, there have been demands for a video-on-demand (VOD) system service as one type of pay television which allows users to view a video program from its beginning at any time they want. Various studies on VOD systems show, however, that since a complete VOD system needs extremely many channels depending on the number of subscribing users, it is difficult to collect the investment made in the VOD system. For this reason, the VOD system is not among various types of pay television that are being studied.

One recent alternative to the VOD system is a service in which video programs of the same contents are sequentially broadcast at certain time intervals ranging from 5 to 15 minutes, for example, in a limited number of frequency channels, and the user selects one of the channels which is most convenient for them at the time of starting to use the service, so that the user can see the video program from the beginning at a desired time though he or she may have to wait a little while. This service is referred to as a near video-on-demand (NVOD) system.

The NVOD system has one problem to be solved yet as to how CM video programs are incorporated into video programs broadcast in the channels. The very nature of such CM video programs requires them to be updated at appropriate intervals so that they will provide latest commercial information.

According to one solution, as many sets of video movie materials and CM video materials as the number of the available channels are prepared, and independently broadcast at certain time intervals in the respective channels. If, however, a pay television broadcasting station is able to establish an NVOD system which broadcasts only one set of video movie materials and CM video materials at certain time intervals in a plurality of channels, then such an NVOD system will be highly convenient and inexpensive for users. It is desirable in such an NVOD system to be able to separate CM video materials from video movie materials for easily updating the CM video materials at appropriate times.

Therefore, it is an object of the present invention to provide an NVOD system capable of incorporating CM video programs, promotion video programs, or the like into video programs, and a broadcasting method for such an NVOD system.

Another object of the present invention is to provide an NVOD system which is capable of easily updating CM video programs, promotion video programs, or the like to be incorporated into video programs.

DISCLOSURE OF THE INVENTION

According to the present invention, a near video-on-demand system comprises control means, high-speed digital reproducing means responsive to a control signal from the control means, for reproducing at a high rate a plurality of video-on-demand system recording data divided from digital data of a main program and recorded at discrete areas, an additional information program data server for reproducing data of an additional information program in response to a control signal from the control means, buffer means responsive to a control signal from the control means, for selectively writing the video-on-demand system recording data from the high-speed digital reproducing means and reading the video-on-demand system recording data, and matrix switcher means responsive to a control signal from the control means, for selectively outputting main program data from the buffer means and additional information data from the additional information program data server, and sequentially transmitting the main program data with the additional information data incorporating therein in a plurality of channels.

According to the present invention, furthermore, a method of broadcasting a main program whose net time is $T_{VIDEO.}$ with an additional information program incorporated at M locations therein, using a near video-on-demand system, comprises the step of increasing the number of channels from the conventional number N of channels to N+M in order to insert the additional information program in the M locations, so that the main program with the additional information program incorporated therein will sequentially be broadcast at the same time intervals as when the main program with the additional information program not incorporated therein is broadcast.

BRIEF DESCRIPTION OF THE DRAWINGS

FIGS. 2A through 2F are diagrams illustrative of a process of broadcasting a video movie with no CM video and promotion video programs incorporated therein in a four-channel NVOD system;

FIGS. 3A through 3G are diagrams illustrative of a process of broadcasting a video movie with CM video and promotion video programs incorporated therein in a five-channel NVOD system;

BEST MODE FOR CARRYING OUT THE INVENTION

Embodiments of an NVOD system capable of incorporating CM video programs, promotion video programs, or the like into video programs, and a broadcasting method for such an NVOD system will be described below with reference to the accompanying drawings.

[Broadcasting a video movie in an NVOD system]

(Process of generating video data)

FIGS. 1A through 1E are illustrative of the manner in which video data for an NVOD system according to an embodiment of the present invention is generated. Video data to be broadcast in the NVOD system, which is recorded on a magnetooptical disk (MO) or a hard disk (HD), for example, is generated from a video movie material according to a process described below.

Figures 1A, 1B, 1C, 1D, 1E:
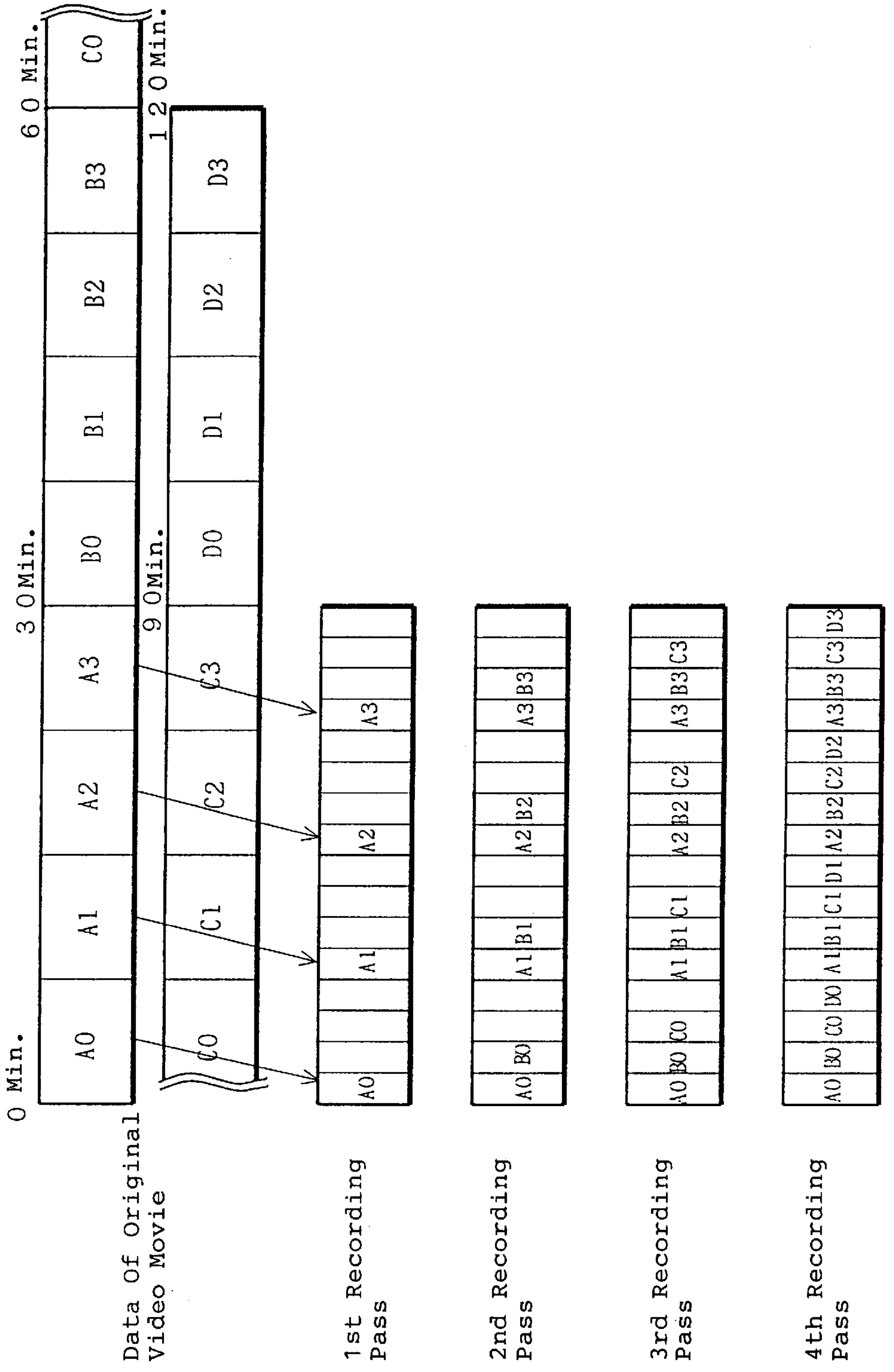
FIGS. 1A through 1E are diagrams illustrative of the manner in which high-density recording data for an NVOD system is generated.

FIG. 1A shows digital data of an original video movie material which is 120 minutes long. The digital video data is divided into four equal data segments A, B, C, D, and each of the four equal data segments A, B, C, D is further divided into four data units each 7.5 minutes long.

Therefore, the digital video data is composed of data units A0, A1, A2, A3, B0, B1, . . . , D2, D3.

From the original video data shown in FIG. 1A, video data for the NVOD system shown in FIG. 1E is generated according to four recording passes shown in FIGS. 1B through 1E.

As shown in FIG. 1B, in the first recording pass, the data units A0, A1, A2, A3 from the original video data are compressed according to a high-efficient coding process such as MPEG2, for example, and then discretely recorded real-time at initial regions, respectively, of four divided areas of an MO, HD, or the like, for example.

Then, as shown in FIG. 1C, in the second recording pass, the data units B0, B1, B2, B3 are similarly compressed, and then recorded real-time at respective regions adjacent to the regions where the data units A0, A1, A2, A3 have already been recorded.

Then, as shown in FIG. 1D, in the third recording pass, the data units C0, C1, C2, C3 are similarly compressed, and then recorded real-time at respective regions adjacent to the regions where the data units B0, B1, B2, B3 have already been recorded.

Thereafter, as shown in FIG. 1E, in the fourth recording pass, the data units D0, D1, D2, D3 are similarly compressed, and then recorded real-time at respective regions adjacent to the regions where the data units C0, C1, C2, C3 have already been recorded.

The four recording passes thus generate compressed data for the NVOD system, whose data units are arranged in a different sequence from the sequence of the data units of the original video data. The video data thus generated serve as video data for the NVOD system.

(Process of broadcasting the video movie)

A process of broadcasting the video movie by sequentially transmitting the video data for the NVOD system at certain time intervals in a plurality of channels (four channels in the embodiment) will be described below with reference to FIGS. 2A through 2F.

FIG. 2A shows the compressed and recorded video data for the NVOD system shown in FIG. 1E.

FIG. 2B shows reproduced data generated by successively repeatedly reproducing the video data shown in FIG. 2A. The video data shown in FIG. 2A is repeatedly reproduced successively at a high rate of one block per 30 minutes, one block comprising the original video data that is 120 minutes long. It is important to note here that the recording data of one block contains all the reproduced data of the original video data.

FIGS. 2C through 2F show video movie data sequentially outputted from the repeatedly reproduced data at certain time intervals in channels #1–#4.

In the channel #1, as shown in FIG. 2C, the compressed data A0, A1, A2, A3 are intermittently read from the first 30-minutes block of the repeatedly reproduced data shown in FIG. 2B, and buffered to produce video data A0, A1, A2, A3 of first 30 minutes of the video movie. Since the first block of successively reproduced data contains all the data of the video movie, it is possible to reproduce arbitrary video data from the first block.

Then, the compressed data B0, B1, B2, B3 are intermittently read from the second 30-minutes block, and buffered to produce video data B0, B1, B2, B3 of next 30 minutes of the video movie.

Then, the compressed data C0, C1, C2, C3 are intermittently read from the third 30-minutes block, and buffered to produce video data C0, C1, C2, C3 of next 30 minutes of the video movie.

Then, the compressed data D0, D1, D2, D3 are intermittently read from the fourth 30-minutes block, and buffered to produce video data D0, D1, D2, D3 of next 30 minutes of the video movie.

According to the above broadcasting process, the video movie which is the same as the video data shown in FIG. 1A is reproduced in its entirety in the channel #1.

Similarly, in the channel #2, as shown in FIG. 2D, video data A0, A1, A2, A3 of first 30 minutes of the video movie are produced from the compressed data A0, A1, A2, A3 of the second block shown in FIG. 2B, next video data B0, B1, B2, B3 of next 30 minutes of the video movie are produced from the compressed data B0, B1, B2, B3 of the third block, next video data C0, C1, C2, C3 of next 30 minutes of the video movie are produced from the compressed data C0, C1, C2, C3 of the fourth block, and next video data D0, D1, D2, D3 of next 30 minutes of the video movie are produced from the compressed data D0, D1, D2, D3 of the fifth block. In this manner, the video movie is reproduced in the channel #2 which starts 30 minutes later than the channel #1.

Likewise, as shown in FIG. 2E, the video movie is reproduced in the channel #3 which starts 30 minutes later than the channel #2, and as shown in FIG. 2F, the video movie is reproduced in the channel #4 which starts 30 minutes later than the channel #3.

In the NVOD system, the block of the video data shown in FIG. 2A is repeatedly reproduced successively at a high rate as shown in FIG. 2B. Therefore, as shown in FIGS. 2C–2F, the video movie starts again in the channel #1 which starts 30 minutes later than the channel #4. Similarly, the video movie sequentially starts in the channels #2, #3, #4 at successive time intervals of 30 minutes.

The process of recording an original video movie material at scattered locations on a hard disk or the like to generate a recording medium for the NVOD system and playing back the recording medium, as described above with reference to FIGS. 1A–1E and 2A–2F is described in detail in U.S. patent application No. 448,243 filed on May 23, 1995 and assigned to the same assignee as the present application (corresponding to Japanese patent applications Nos. 6-112, 940 and 6-119,342). Reference should be made to the above application if necessary.

The recording medium for broadcasting video data in the NVOD system comprises a magnetooptical disk (MO) or a hard disk (HD), for example. The recording process shown in FIGS. 1A through 1E and the reproducing process shown in FIGS. 2A through 2E may be modified on the basis of the capability of a magnetooptical disk drive or a hard disk drive. More specifically, since the performance of recent hard disk drives is greatly improved, data recorded on a hard disk can be reproduced at a relatively high bit rate compared with the bit rate at which the data was recorded. Therefore, in the recording process shown in FIGS. 1A through 1E, the video data may be recorded directly on a hard disk without relying on the compression technology such as MPEG2 or the like, producing a recording medium for the NVOD system (see FIG. 1E), and in the reproducing process shown in FIGS. 2A through 2E, the recorded video data may be reproduced at a high rate such as a quadruple rate, for example.

Furthermore, in the recording process shown in FIGS. 1A through 1E, the video data may be compressed according to a moving image compression process such as MPEG2 to reduce the amount of data, and may be stored as compressed data on a hard disk. If the compression ratio is 1/10, then when the compressed data is reproduced at a normal rate, it is reproduced at a rate ten times higher than the normal rate in terms of the original video data.

A process of time compression may also be employed. Specifically, in the recording process shown in FIGS. 1A through 1E, the video data may be time-compressed to ¼. In the reproducing process, the time-compressed video data may be reproduced at a normal rate. As a result, the video data may be reproduced at a quadruple rate in terms of the original video data. The above processes may be combined with each other.

At any rate, the above processes may be used to reproduce the video data at a quadruple rate, for example, in terms of the original video data, compared with the recording rate in the recording process shown in FIGS. 1A through 1E. Unless otherwise specified, the reproduction of the video data at a high rate as described herein includes all recording and reproducing processes described above.

In the above embodiment, there are four channels available for a video movie that is 120 minutes long, and the user can select one of the four channels in which the video movie starts from the beginning at any desired time. Therefore, the user can start viewing the video movie without waiting for more than 30 minutes at maximum.

Generally, if a video movie which is $T_{VIDEO.}$ minutes long is sequentially broadcast at equal time intervals in an NVOD system with N channels, then the user can start viewing the video movie from the beginning at a maximum possible waiting time of $Td=T_{VIDEO.}/N$ [minutes]. Since the NVOD system that has actually been proposed has about 16 channels, a maximum possible waiting time for the user to start viewing a video movie whose net time is 120 minutes at any desired time is about 7.5 minutes.

[NVOD system for incorporating CM video programs, promotion video programs, or like into a video movie program]

An NVOD system for incorporating CM video programs, promotion video programs, or like into a video movie program based on the same NVOD system video data as described above, and sequentially transmitting the video data at certain time intervals into a plurality of channels will be described below with reference to FIGS. 3A through 3G.

In order to equalize time intervals at which the video movie data is transmitted into the channels, the NVOD system has five channels, one more channel than the channels shown in FIGS. 2A through 2F.

FIG. 3A shows the repeatedly reproduced data which is the same as the data shown in FIG. 2B. The recording data which has been compressed to 30 minutes from a video movie that is 120 minutes long is used as one block and repeatedly reproduced at a high rate.

Figure 6:
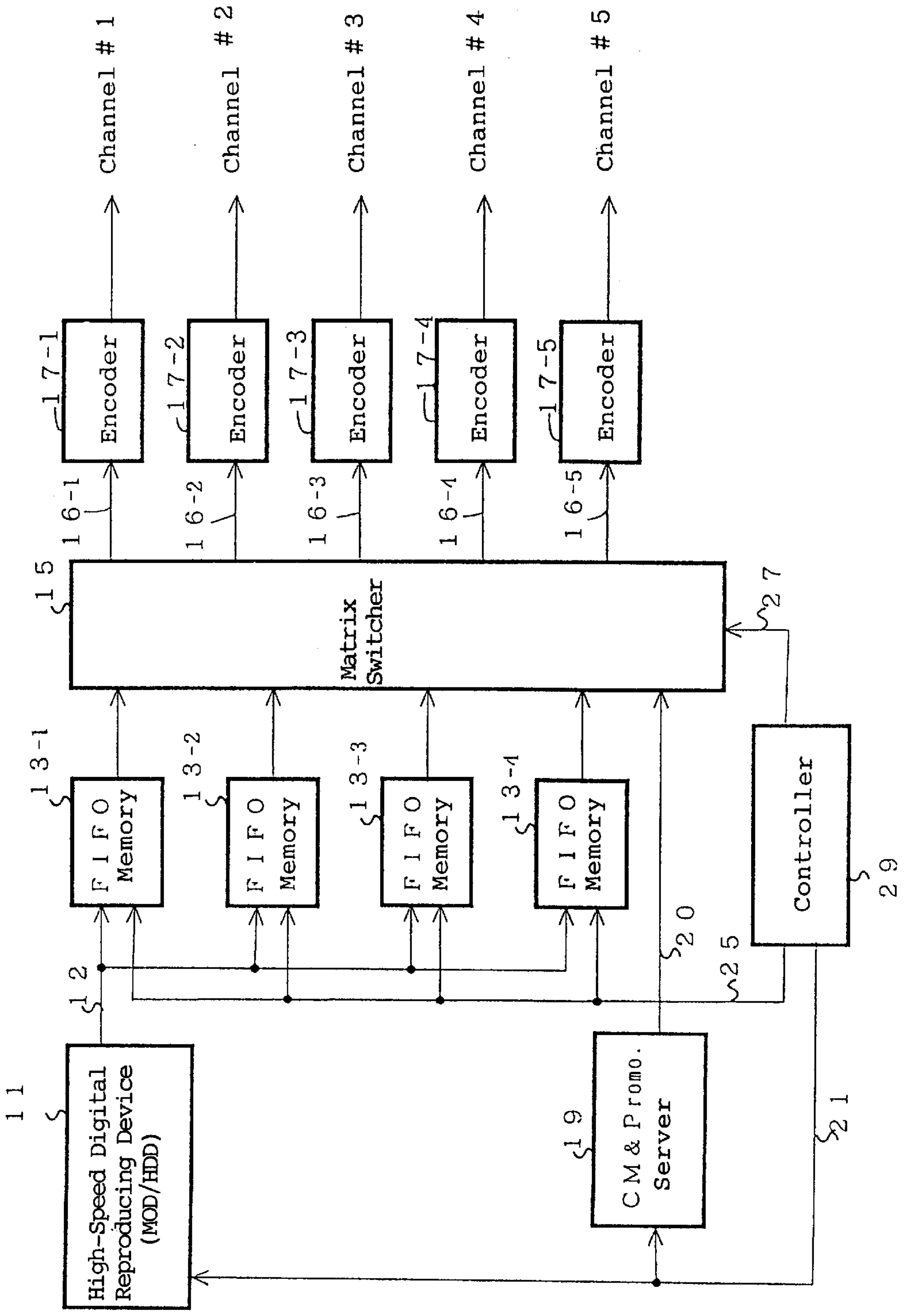
FIG. 6 is a block diagram of an apparatus for incorporating a CM video or promotion video program in a five-channel NVOD system.

FIG. 3B shows the data of promotion video programs stored in a CM & Promo. server (see "19" in FIG. 6). The data include promotion video data Promo. 1, Promo. 2, Promo. 3, Promo. 4, Promo. 5, . . . , each recorded as one block. When the promotion video data Promo. 1–Promo. 5 are broadcast, they have to be at most 30 minutes long. The promotion video data Promo. 1–Promo. 5 may be of the same contents.

FIGS. 3C through 3G show video movie data containing promotion video data, which are sequentially transmitted at certain time intervals in channels #1–#5.

In the channel #1, as shown in FIG. 3C, the promotion video data Promo. 1 is read from the output data from the CM & Promo. server shown in FIG. 3B, and outputted before the video movie starts being broadcast. Thereafter, the video movie is reproduced in the same manner as described above with reference to FIGS. 2A through 2F. Specifically, in the next 30 minutes, the data A0, A1, A2, A3 are intermittently read from the second block shown in FIG. 3A, and expanded to produce video data A0, A1, A2, A3 of 30 minutes. Then, in the next 30 minutes, the data B0, B1, B2, B3 are intermittently read from the third block shown in FIG. 3A, and expanded to produce video data B0, B1, B2, B3 of 30 minutes. Then, in the next 30 minutes, the data C0, C1, C2, C3 are intermittently read from the fourth block shown in FIG. 3A, and expanded to produce video data C0, C1, C2, C3 of 30 minutes. Then, in the next 30 minutes, the data D0, D1, D2, D3 are intermittently read from the fifth block shown in FIG. 3A, and expanded to produce video data D0, D1, D2, D3 of 30 minutes.

In the channel #1, therefore, as shown in FIG. 3C, the promotion video data Promo. 1 is broadcast before the video movie starts being broadcast, and thereafter, the video movie is reproduced in its entirety in the same manner as shown in FIG. 2C.

Similarly, in the channel #2, as shown in FIG. 3D, the promotion video data Promo. 2 is outputted from the output data from the CM & Promo. server shown in FIG. 3B, 30 minutes later than the channel #2. In the next 30 minutes, video data A0, A1, A2, A3 of the first 30 minutes are produced from the data A0, A1, A2, A3 of the third block shown in FIG. 3A. Then, in the next 30 minutes, video data B0, B1, B2, B3 of the next 30 minutes are produced from the data B0, B1, B2, B3 of the fourth block shown in FIG. 3A. Then, in the next 30 minutes, video data C0, C1, C2, C3 of the next 30 minutes are produced from the data C0, C1, C2, C3 of the fifth block shown in FIG. 3A. Then, in the next 30 minutes, video data D0, D1, D2, D3 of the next 30 minutes are produced from the data D0, D1, D2, D3 of the sixth block shown in FIG. 3A. Thus, in the channel #2, the promotion video data Promo. 2 is incorporated before the video movie is started, and the same video movie as shown in FIG. 1A which starts 30 minutes later than the channel #1 is reproduced in its entirety.

Likewise, in the channel #3, as shown in FIG. 3E, the promotion video data Promo. 3 is incorporated before the video movie is started, and the video movie which starts 30 minutes later than the channel #2 is outputted in its entirety.

In the channel #4, as shown in FIG. 3F, the promotion video data Promo. 4 is incorporated before the video movie is started, and the video movie which starts 30 minutes later than the channel #3 is outputted in its entirety. In the channel #5, as shown in FIG. 3G, the promotion video data Promo. 5 is incorporated before the video movie is started, and the video movie which starts 30 minutes later than the channel #4 is outputted in its entirety.

In the above embodiment, a total of five channels, one more channel than the channels shown in FIGS. 2A through 2F, are provided for broadcasting a video movie which is 120 minutes long, and the user may select, at a desired time, a channel for the video movie that starts immediately after the desired time, for viewing the video movie in which a CM video program or the like is incorporated, without having to wait for more than 30 minutes.

As described with reference to FIGS. 2A through 2F, since the NVOD system that has actually been proposed has 16 channels, a maximum possible waiting time is about 7.5 minutes.

In the embodiment shown in FIGS. 3A through 3G, a CM video program or the like is incorporated prior to the start of the first block of a video movie. The incorporation of a CM video program or the like is carried out by switching operation of a matrix switcher 15 which will be described later on with reference to FIG. 6. Therefore, a CM video program or the like can be incorporated as desired between arbitrary blocks of video data.

Figure 4:
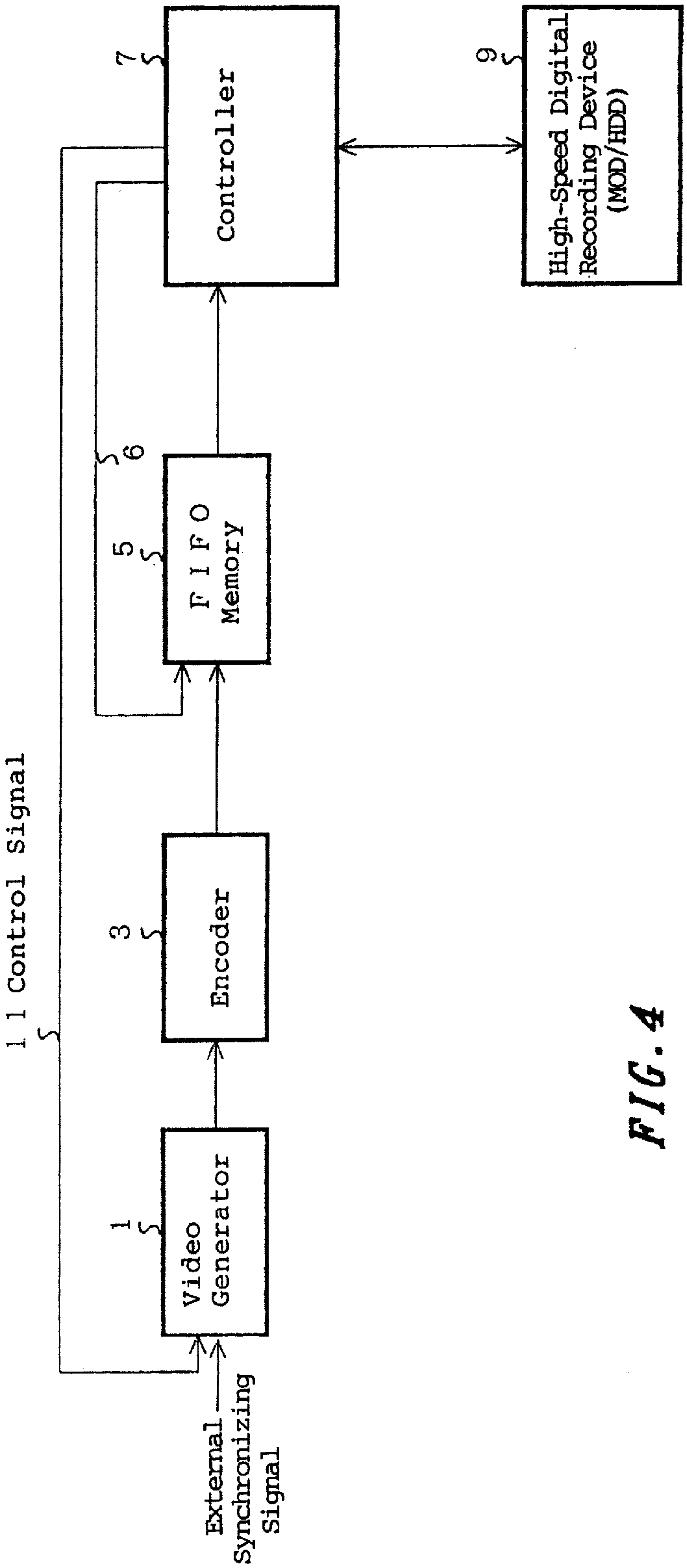
FIG. 4 is a block diagram of an apparatus for generating high-density recording data for an NVOD system as shown in FIG. 1.

If a video movie which is $T_{VIDEO.}$ minutes long with a CM video program or the like incorporated at M locations therein is sequentially broadcast at equal time intervals in an NVOD system with N+M channels, then the user can start viewing the video movie from the beginning at a maximum possible waiting time of $Td=T_{VIDEO.}/N$ [minutes]. [Video data generating apparatus] FIG. 4 shows by way of example a video data generating apparatus for generating video data according to the four recording passes described above with reference to FIGS. 1B through 1E. The video data generating apparatus comprises a video reproducer 1 such as a video disk player for reproducing video data recorded on a video disk, for example, an encoder 3 for effecting a high-efficiency coding process on video data reproduced by the video reproducer 1, an FIFO memory 5 for buffering a compressed signal from the encoder 3, a controller 7 for reading a compressed digital signal from the FIFO memory 5, and a high-speed digital recording device 9 such as a magnetooptical disk drive (MOD) or a hard disk drive (HDD) for recording the compressed digital signal from the controller 7 under the control of the controller 7.

The video reproducer 1 is a device for reproducing video data. The video reproducer 1 is controlled by a control signal from the controller 7 to access a given recording position for controlling the time to start reproducing the recorded video data. The video reproducer 1 can also be controlled in synchronism with an external synchronizing signal 13 when necessary.

The encoder 3 comprises a real-time video compressor for bandwidth-compressing video data according to a moving image compression process such as MPEG2.

The FIFO memory 5, or a first-in, first-out memory, serves to buffer the compressed video data by writing and reading the compressed video data at given times in response to a timing signal 6 from the controller 7, and transmit the read video data to the controller 7.

The controller 7 controls the time to start reproducing the recorded video data with the video reproducer 1, determines a time to read the compressed digital signal from the FIFO memory 5, and also determines a time to write the compressed digital signal in a given area of the recording medium with the high-speed digital recording device 9.

The high-speed digital recording device 9 comprises an MOD (magnetooptical disk drive) or an HDD (hard disk drive), for example, for recording at a high density the digital video data from the controller 7 in positions described above with reference to FIGS. 1B through 1E.

The video data generating apparatus operates as follows: In the first recording pass initiated by a reproduction start control signal supplied from the controller 7 to the video reproducer 1, the data units A0, A1, A2, A3 of the first 30 minutes which have been reproduced by the video reproducer 1 are compressed by the encoder 3, and the compressed data are sent to the FIFO memory 5, from which the data are read at given times according to a timing signal from the controller 7 and recorded as compressed data A0, A1, A2, A3 in initial portions of respective four equal areas (see FIG. 1B) of the recording medium in the high-speed digital recording device 9.

Similarly, in the second recording pass, the data B0, B1, B2, B3 are recorded as compressed data B0, B1, B2, B3 in the respective areas as shown in FIG. 1C. In the third recording pass, the data C0, C1, C2, C3 are recorded as compressed data C0, C1, C2, C3 in the respective areas as shown in FIG. 1D. In the fourth recording pass, the data D0, D1, D2, D3 are recorded as compressed data D0, D1, D2, D3 in the respective areas as shown in FIG. 1E. In this manner, the high-density data as shown in FIG. 1E are stored in the high-speed digital recording device 9.

Figure 5:
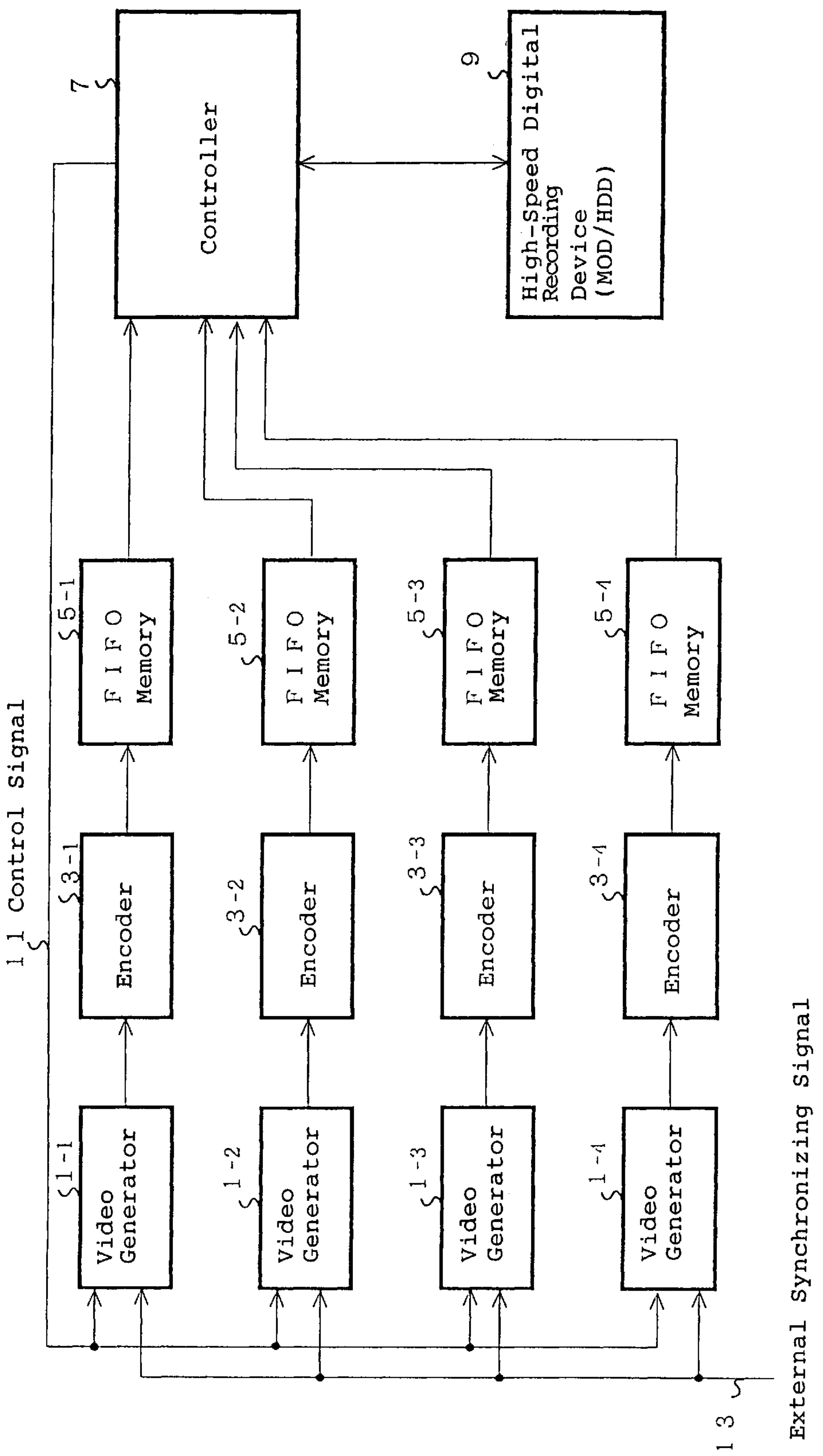
FIG. 5 is a block diagram of another apparatus for generating high-density recording data for an NVOD system as shown in FIG. 1.

It is possible to generate high-density video data in the first recording pass. FIG. 5 shows a high-density recording video data generating apparatus for use in generating such high-density video data. Basically, the high-density recording video data generating apparatus comprises four of the video data generating apparatus shown in FIG. 4 which are connected parallel to each other. Specifically, the high-density recording video data generating apparatus comprises video reproducers 1-1, . . . , 1-4 for reproducing original video data, encoders 3-1, . . . , 3-4 for compressing video data reproduced by the video reproducers 1-1, . . . , 1-4, FIFO memories 5-1, . . . , 5-4 for buffering compressed signals from the encoders 3-1, . . . , 3-4, a controller 7 for reading compressed digital signals from the FIFO memories 5-1, . . . , 5-4 and controlling the video disk devices, and a high-speed digital recording device 9 such as an MOD or an HDD for recording the compressed digital signals read by the controller 7.

The video reproducers 1-1, . . . , 1-4 output respective video data 0, 30, 60, 90 minutes after the control signal 11 starts reproducing the video data.

The encoders 3-1, . . . , 3-4 compress the video data real-time. Specifically, the encoder 3-1 is supplied with the video data A0, A1, A2, A3, compresses them, and writes the compressed video data in the FIFO memory 5-1. The encoder 3-2 is supplied with the video data B0, B1, B2, B3, compresses them, and writes the compressed video data in the FIFO memory 5-2. The encoder 3-3 is supplied with the video data C0, C1, C2, C3, compresses them, and writes the compressed video data in the FIFO memory 5-3. The encoder 3-4 is supplied with the video data D0, D1, D2, D3, compresses them, and writes the compressed video data in the FIFO memory 5-4.

The controller 7 reads the compressed digital signals from the FIFO memories 5-1, . . . , 5-4 in the order shown in FIG. 1E, and writes the compressed digital signals in the MOD/HDD 9 at a high rate. The high-density recording video data generating apparatus generates NVOD system video data recorded at a high density as shown in FIG. 1E according a single recording pass. An actually proposed 16-channel NVOD system has 16 video reproducers 1, 16 encoders 3, and 16 FIFO memories 5 which are connected parallel to each other.

[Apparatus for and method of incorporating a CM video program or the like in an NVOD system]

FIG. 6 shows by way of example an apparatus for incorporating a CM video program or the like in an NVOD system. The apparatus comprises a high-speed digital reproducing device 11 such as an MOD or an HDD, a CM & Promo. server 19 for outputting video data such as CM video or promotion video data, FIFO memories 13-1, 13-2, 13-3, 13-4 for buffering compressed data reproduced by the high-speed digital reproducing device 11, a matrix switcher 15 for selectively reading compressed data stored in the FIFO memories 13-1, 13-2, 13-3, 13-4 or compressed data from the CM & Promo. server 19, and outputting the selected data, and encoders 17-1, 17-2, 17-3, 17-4, 17-5 for adding an error-correcting code to compressed data such as video movie data and CM video data or the like from the matrix switcher 15, interleaving the data, adding a synchronizing signal to the data, and outputting the data to respective channels #1–#5.

The apparatus also has a controller 29 for sending a reproduction start synchronizing signal 21 to the high-speed digital reproducing device 11 and the CM & Promo. server 19, a write/read timing signal 25 to the FIFO memories 13-1, 13-2, 13-3, 13-4, and a switching control signal to the matrix switcher 15 to select data to be outputted to the channels #1–#5.

The high-speed digital reproducing device 11 comprises magnetooptical disk drive (MOD) or a hard disk drive (HDD) for successively reproducing at a high rate NVOD system video data which have been recorded at a high density as shown in FIG. 1E.

The CM & Promo. server 19 is one type of video server, and comprises a device for storing and distributing data such as CM video data or the like. The CM & Promo. server 19 stores data such as CM video data or the like compressed under the same conditions as video movie blocks, as shown in FIG. 3B, and reproduces and outputs the stored data.

The FIFO memories 13-1, , 13-4, or first-in, first-out memories, serve to buffer the compressed video signals from the high-speed digital reproducing device 11 by selectively writing and reading the compressed video signals in response to a control signal from the controller 29 for transmission to the matrix switcher 15.

The matrix switcher 15 receives the compressed video data from the FIFO memories 13-1, . . . , 13-4 or the compressed CM video data or the like from the CM & Promo. server 19, and selectively outputs the received data to the channels in response to a switching control signal 27 from the controller 29. In a small-scale NVOD system for use in a hotel or the like, the respective channels may have decoders for decoding the compressed video data from the matrix switcher 15 and outputting the decoded video data to the channels.

The encoders 17-1, . . . , 17-5 add an error-correcting code to the CM video and video movie data from the matrix switcher 15, interleave the data, add a synchronizing signal to the data, and output the data to the respective channels #1–#5.

The apparatus shown in FIG. 6 resides in that the number of channels is one greater than the number of FIFO memories for reading video movie data stored in the high-speed digital reproducing device 11.

FIGS. 7A through 7K are illustrative of the manner in which the apparatus shown in FIG. 6 operates for incorporating CM video data or the like in an NVOD system.

Figures 7A, 7B, 7C, 7D, 7E, 7F, 7G, 7H, 7I, 7J, 7K:
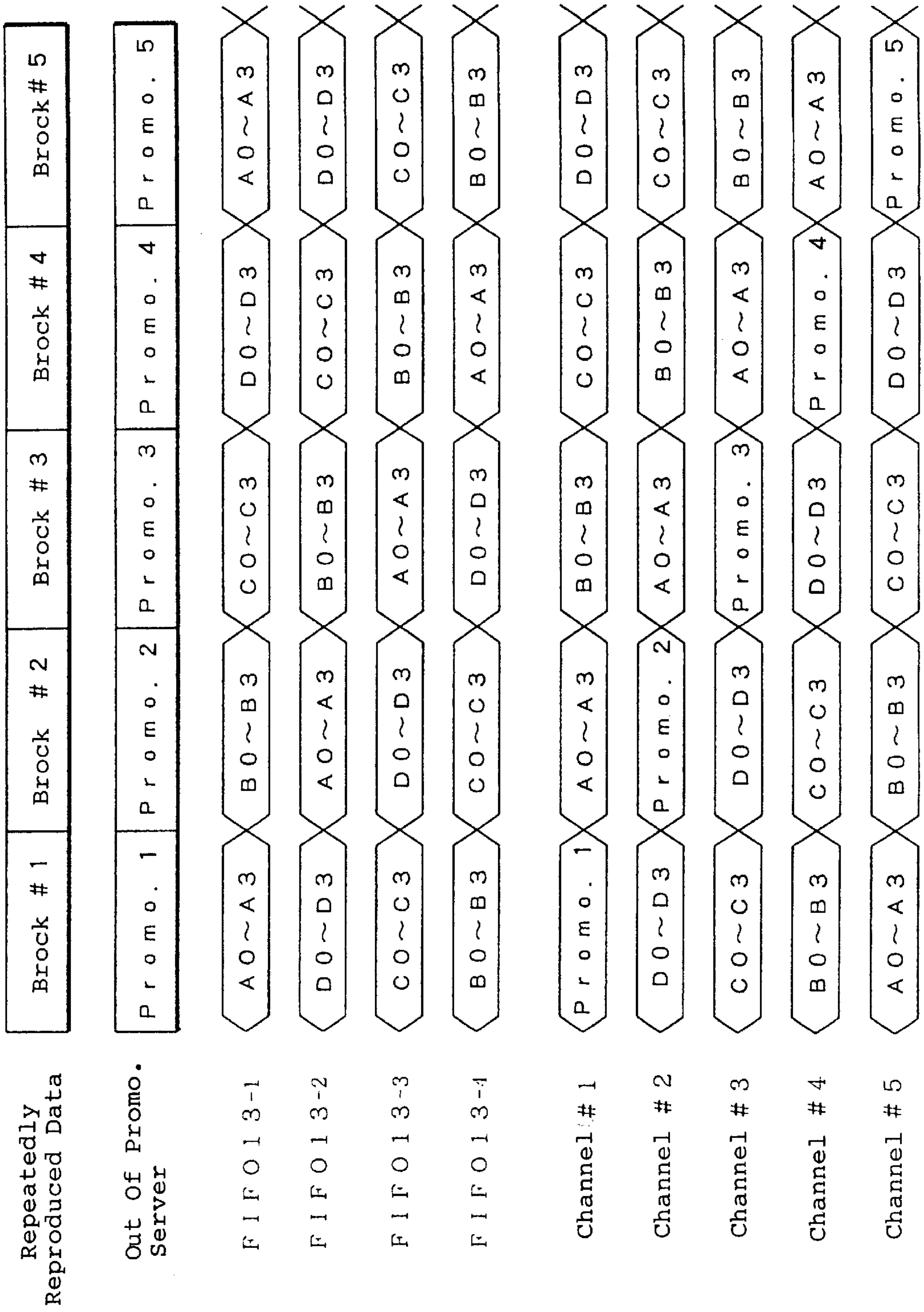
FIGS. 7A through 7K are diagrams illustrative of the manner in which the apparatus shown in FIG. 6 operates.

FIG. 7A shows compressed video data 12 outputted from the speed digital reproducing device 11 in response to the reproduction start synchronizing signal 21 from the controller 29.

FIG. 7B shows compressed promotion video data 20 outputted from the CM & Promo. server 19 in response to the reproduction start synchronizing signal 21 from the controller 29.

FIGS. 7C through 7E show video data outputted from the FIFO memories 13-1, . . . , 13-4 which have selectively stored the video data 12 shown in FIG. 7A, in response to the timing signal 25 from the controller 29 as described above with reference to FIG. 6. For example, as shown in FIG. 7C, the FIFO memory 13-1 selectively stores compressed data A0–A3 from the first block shown in FIG. 7A, compressed data B0–B3 from the second block, compressed data C0–C3 from the third block, and compressed data D0–D3 from the fourth block. Similarly, as shown in FIG. 7D, the FIFO memory 13-2 stores compressed data A0 A3, B0–B3, C0–C3, D0–D3 at times 30 minutes later than the FIFO memory 13-1. Similarly, as shown in FIG. 7E, the FIFO memory 13-3 stores compressed data A0–A3, B0–B3, C0–C3, D0–D3 at times 30 minutes later than the FIFO memory 13-2. Similarly, as shown in FIG. 7F, the FIFO memory 13-4 stores compressed data A0–A3, B0–B3, C0–C3, D0–D3 at times 30 minutes later than the FIFO memory 13-3.

FIGS. 7G through 7K show data 14-1, . . . , 14-4 (see FIGS. 7G–7F) such as compressed video data from the FIFO memories 13-1, . . . , 13-4 and compressed promotion video data 20 from the CM & Promo. server 19, which the matrix switcher 12 has selectively outputted to the channels #1–#5 in response to the switching control signal 27 from the controller 29. These data comprise video data combined with CM video data or the like, and supplied through the respective encoders 17-1, . . . , 17-5 to the respective channels.

For example, in response to the switching control signal 27 from the controller 29, the matrix switcher 15 selectively outputs the data from the CM & Promo. server 19 to the channel #1 for the first 30 minutes. At the same time, the matrix switcher 15 selectively outputs the video data from the FIFO memories 13-1, . . . , 13-4 to the respective channels #5, #2, #3, #4.

In the next 30 minutes, the matrix switcher 15 selectively outputs the data from the CM & Promo. server 19 to the channel #2, and at the same time, selectively outputs the video data from the FIFO memories 13-1, . . . , 13-4 to the respective channels #5, #1, #3, #4.

In the next 30 minutes, the matrix switcher 15 selectively outputs the data from the CM & Promo. server 19 to the channel #3, and at the same time, selectively outputs the video data from the FIFO memories 13-1, , 13-4 to the respective channels #5, #1, #2, #4.

In the next 30 minutes, the matrix switcher 15 selectively outputs the data from the CM & Promo. server 19 to the channel #4, and at the same time, selectively outputs the video data from the FIFO memories 13-1, . . . , 13-4 to the respective channels #5, #1, #2, #3.

In the next 30 minutes, the matrix switcher 15 selectively outputs the data from the CM & Promo. server 19 to the channel #5, and at the same time, selectively outputs the video data from the FIFO memories 13-1, . . . 13-4 to the respective channels #4, #1, #2, #3.

In the next 30 minutes, the matrix switcher 15 selectively outputs the data from the CM & Promo. server 19 to the channel #5, and at the same time, selectively outputs the video data from the FIFO memories 13-1, . . . , 13-4 to the respective channels #4, #1, #2, #4. Subsequently, the above cycles are repeated. The encoders 17-1, . . . , 17-5 add an error-correcting code to the data and otherwise process the data, and transmit the data to the users.

In as much as the actually proposed NVOD system has 16 channels, as described above, a maximum possible waiting time for the user to start viewing a video movie, 120 minutes long, is about 7.5 minutes with 17 channels available. If CM video data or the like is incorporated at two locations in video movie data, then the video movie data can similarly be broadcast by using 18 channels.

Generally, for broadcasting a video movie whose net time is $T_{VIDEO.}$ [minutes] with CM video data or the like incorporated at M locations therein with an NVOD system, if the video data are to be sequentially broadcast at time intervals of about $T_{VIDEO.}/N$ [minutes] that are equal to those with video data with no CM video data or the like incorporated therein, then the video data with CM video data or the like incorporated can be broadcast by increasing the number of channels to N+M. The period of time of the CM video data or the like at each location is kept within $T_{VIDEO.}/N$ [minutes].

Conversely, it is possible to fix the number L of channels of an NVOD system, combine a video movie whose net time is $T_{VIDEO.}$ [minutes] and CM video data or the like whose broadcasting time is $T_{Promo.}$ [minutes], and broadcast the video movie data sequentially at equal time intervals. In the NVOD system, the video movie data are sequentially broadcast at time intervals of $T_{VIDEO.}/L$ [minutes] through the L channels. The video movie which is $T_{VIDEO.}$ [minutes] in each of the channels is recognized as interconnected blocks each $T_{VIDEO.}/L$ [minutes] (T=d) long.

For incorporating CM video data or the like, the CM video data or the like is divided into video data whose number is indicated by a value P which is determined as $T_{Promo.}+Td \approx P$ (P is an integer produced by counting the fractions to the decimal point as a whole number) (therefore, the CM video data or the like at each location is at most $T_{VIDEO.}/L$ [minutes] long), and the P blocks of the CM video data or the like are inserted between desired P blocks of the video movie data. The insertion is carried out by the matrix switcher 15. The total broadcasting time of the video movie with the CM video data or the like incorporated therein is expressed by $(Td+T_{Promo.}/Td) \cdot L = T_{VIDEO.}+T_{Promo.}$ [minutes].

According to the above embodiment, for broadcasting a video movie whose net time is $T_{VIDEO.}$ [minutes] with CM video data or the like incorporated at M locations therein with an NVOD system, the video data with CM video data or the like incorporated can be broadcast at time intervals of about $T_{VIDEO.}/N$ [minutes] that are equal to those with video data with no CM video data or the like incorporated therein, by increasing the number of channels to N+M.

Conversely, if the number L of channels of an NVOD system is fixed, a video movie whose net time is $T_{VIDEO.}$ [minutes] and CM video data or promotion video data whose broadcasting time is $T_{Promo.}$ [minutes] are combined with each other, and the video movie data are broadcast sequentially at equal time intervals, then the video movie data are sequentially broadcast at time intervals of $T_{VIDEO.}/L$ [minutes] through the L channels. For incorporating CM video data or the like, the CM video data or the like is divided into video data whose number is indicated by a value P which is determined as $T_{Promo.} \cdot Td \approx P$ (P is an integer produced by counting the fractions to the decimal point as a whole number), and the P blocks of the CM video data or the like are inserted at P locations between two adjacent blocks of the video movie data. According to the above embodiment, there are provided an apparatus of and a method for carrying out the above process.

According to the above embodiment, furthermore, since the storage medium for the data of a video movie and the storage medium for the data of CM video programs or the like are separate from each other, the CM video programs or the like can be updated as desired.

[Advantages of the invention]

According to the present invention, there is thus provided an NVOD system capable of incorporating additional information programs such as CM video programs, promotion video programs, or the like into main video programs, and a broadcasting method for such an NVOD system.

According to the present invention, there is also provided an NVOD system which is capable of easily updating additional information programs such as CM video programs, promotion video programs, or the like to be incorporated into main video programs.

What is claimed is:

1. A near video-on-demand system comprising:

control means;

high-speed digital reproducing means responsive to a control signal from said control means, for reproducing at a high rate a plurality of video-on-demand system recording data divided from digital data of a main program and recorded at discrete areas;

an additional information program data server for reproducing data of an additional information program in response to a control signal from said control means;

buffer means responsive to a control signal from said control means, for selectively writing the video-on-demand system recording data from said high-speed digital reproducing means and reading the video-on-demand system recording data; and matrix switcher means responsive to a control signal from said control means, for selectively outputting main program data from said buffer means and additional information data from said additional information program data server, and sequentially transmitting the main program data with the additional information data incorporated at M locations therein to a number of channels, wherein the number of channels to which the matrix switcher means transmits the main program data and the additional information data in predetermined time intervals is (N+M), in which N represents the number of channels to which the main program data without the additional information data would be transmitted to in the predetermined time intervals.

2. A near video-on-demand system according to claim 1, wherein said main program comprises a video movie, and said additional information program comprises a commercial video program or a promotion program.

3. A near video-on-demand system according to claim 1, wherein said high-speed digital reproducing means comprises a magnetooptical disk drive or a hard disk drive.

4. A near video-on-demand system according to claim 1, wherein if said main program is $T_{VIDEO.}$ long, then said video-on-demand system recording data are produced by dividing the digital data of the main program into a number of blocks related to the number N of the channels, and the data of the blocks are further divided and discretely recorded, and wherein said high-speed digital reproducing means successively reproduces at a high rate said video-on-demand system recording data to reproduce all the data of the main program at time intervals of $T_{VIDEO.}/N$.

5. A near video-on-demand system according to claim 1, wherein said video-on-demand system recording data are recorded in a compressed state.

6. A near video-on-demand system comprising:

control means;

high-speed digital reproducing means responsive to a control signal from said control means, for reproducing at a high rate a plurality of video-on-demand system recording data divided from digital data of a main program and recorded at discrete areas;

an additional information program data server for reproducing data of an additional information program in response to a control signal from said control means;

buffer means including a number of first in, first out memory means responsive to a control signal from said control means for selectively writing the video-on-demand system recording data from said high-speed digital reproducing means and reading the video-on-demand system recording data; and matrix switcher means responsive to a control signal from said control means, for selectively outputting main program data from said buffer means and additional information data from said additional information program data server, and sequentially transmitting the main program data with the additional information data incorporating therein in a plurality of channels, wherein if the number of said first-in, first-out memory means is N and said additional information program is incorporated at M locations, then the number of the channels is N+M.

7. A near video-on-demand system comprising:

control means;

high-speed digital reproducing means responsive to a control signal from said control means for reproducing at a high rate a plurality of video-on-demand system recording data divided from digital data of a main program and recorded at discrete areas;

an additional information program data server for reproducing data of an additional information program in response to a control signal from said control means;

buffer means including a number of first in, first out memory means responsive to a control signal from said control means for selectively writing the video-on-demand system recording data from said high-speed digital reproducing means and reading the video-on-demand system recording data; and matrix switcher means responsive to a control signal from said control means, for selectively outputting main program data from said buffer means and additional information data from said additional information program data server, and sequentially transmitting the main program data with the additional information data incorporating therein in a plurality of channels, wherein said matrix switcher means receives the data of the additional information program from said additional information program data server and video data from said N first-in, first-out memory means, and transmits the received data to the channels.

8. A method of broadcasting a main program whose net time is $T_{VIDEO.}$ with an additional information program incorporated at M locations therein, using a near video-on-demand system, comprising the step of:

increasing the number of channels from the conventional number N of channels to N+M in order to insert the additional information program in the M locations, so that the main program with the additional information program incorporated therein will sequentially be broadcast at the same time intervals as when the main program with the additional information program not incorporated therein is broadcast.

* * * * *